March 14, 1933.  W. FERRIS  1,901,500
BROACHING MACHINE
Filed Dec. 18, 1929  4 Sheets-Sheet 1

Inventor
WALTER FERRIS.
By
Attorney

Fig. 2.

March 14, 1933.     W. FERRIS     1,901,500
BROACHING MACHINE
Filed Dec. 18, 1929     4 Sheets-Sheet 3

Inventor
WALTER FERRIS.

By Ralph Lustrom
Attorney

March 14, 1933.  W. FERRIS  1,901,500

BROACHING MACHINE

Filed Dec. 18, 1929  4 Sheets-Sheet 4

Fig. 5.

Inventor
WALTER FERRIS.
By Ralph W Brown
Attorney

Patented Mar. 14, 1933

1,901,500

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

BROACHING MACHINE

Application filed December 18, 1929. Serial No. 414,905.

The broaching machine to which the invention applies in particular is provided with a work support to sustain the pressure of the work during a broaching operation, a tool head to carry a broaching tool, and power means arranged alongside the broaching tool and operable to effect relative reciprocation between the tool head and the work support to enable the broaching tool to broach the work, such as the broaching machine described and claimed in Patent No. 1,823,975 issued to me September 22, 1931, upon application Serial No. 544,534, filed March 17, 1922, of which the present application is a continuation as to matters common to both applications.

The broaching machines produced prior to the broaching machine disclosed in Patent No. 1,823,975 had the power screw or hydraulic motor arranged in series with the drawhead and the broaching tool. Consequently, a machine of this character occupied a large amount of floor space and its extended length was so great that it could not be arranged vertically in shops in which such machines are ordinarily employed.

The invention disclosed in Patent No. 1,823,975 had as its basic or fundamental concept the production of a broaching machine which would have an extended length or height substantially one-third less than that of the prior machines. The invention was shown embodied in a broaching machine having two reciprocating hydraulic motors arranged vertically above its work support and the piston rods of the motors connected to a drawhead which was arranged below the work support and reciprocated vertically by the motors to pull a broaching tool downwardly through the work support.

The basic or fundamental concept of the invention is also embodied in the machine disclosed in Patent No. 1,532,107, issued to me on March 31, 1925, upon an application filed January 19, 1923.

The machine shown in Patent No. 1,532,107 is a modification of the machine shown in Patent No. 1,823,975 and has two reciprocating hydraulic motors arranged below its work support and the piston rods of the motors connected to a tool head which is arranged above the work support and reciprocated vertically by the motors to pull a broaching tool upwardly through the work support.

Both of these machines, in the sizes most commonly employed, have the work support arranged at such a height from the floor that considerable effort is required to feed heavy pieces of work to the machine.

An object of the invention is to arrange the work support near the base of the machine.

Another object is to provide the machine with a mechanical feed for moving the work into and out of position to be broached.

Another object is to provide a machine of this character in which the broaching tool is held stationary and the work is moved upwardly along the tool.

Another object is to provide a vertical broaching machine which may be loaded and unloaded when the work support is in its lowermost position.

Other objects and advantages will be apparent from the description hereinafter set forth of an embodiment of the invention.

According to the invention in its general aspect and as ordinarily applied and embodied in practice, the broaching tool is arranged alongside the motor or other power means and retained in a stationary position during the broaching operation, and a work support moves the work along the tool to broach the same.

The invention is embodied in the vertical broaching machine illustrated in the accompanying drawings in which the views are as follows.

Figure 4:
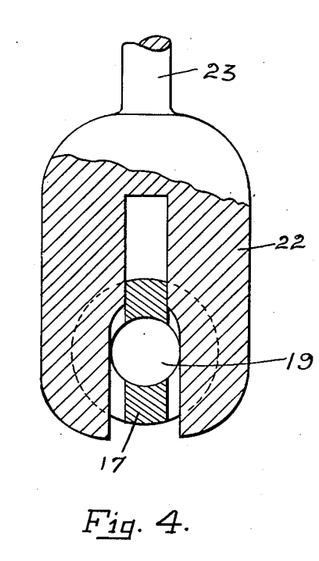
Fig. 4 is a plan view, partly in section, taken on the line 4—4 of Fig. 1.

The broaching machine is provided with a frame or housing 10 which is supported upon lugs 11 and 12 carried by a base 13 having the edges thereof extending upwardly to form a catch basin for chips and liquids. The forward lugs 11 also form supports for a pair of upright cylinders 14 and for a cross member 15 whose opposite ends 16 are interposed between the cylinders and lugs. A draw head 17 fixed in a central opening 18 in the member 15 is socketed, as at 19, to receive the nose 20 of a broaching tool 21. As indicated in Fig. 4, the opposite sides of the draw head 17 are slotted to receive the forked end 22 of a locking bar 23 which cooperates with an annular groove 24 formed in the nose of the tool to lock the same in the draw head. The locking bar is reciprocated lengthwise into and out of locking position by appropriate means, such as a piston 25 connected thereto and working in a horizontal cylinder 26 secured in a stationary position within the frame 10.

A pair of pistons 27 working in the cylinders 14 support and actuate a vertically reciprocable work support preferably of a type such as will now be described. This work support is substantially U-shaped having a pair of upright side members 28 which partially surround the cylinders 14 and which are integrally connected adjacent their lower ends by a horizontal plate 29 forming a support for the work piece A.

When the pistons 27 are retracted to their lowermost positions, the pressure plate 29 is spaced but a short distance from the base of the machine and at a convenient loading height from the floor.

An upright flange 30 at the rear of the plate 29 and formed integral therewith and with the side members 28 serves to strengthen the work support and also to confine the chips against escape rearwardly onto the active parts of the machine. The plate 29 is provided with the usual central opening 31 to permit free passage of the tool 21 therethrough. A pair of slotted shoes 32 and 33, formed on the rear of each upright 28 adjacent the upper and lower ends thereof, are closely fitted for travel along the outer edges of a pair of vertical guide plates 34 fixed to the front face of the frame 10. The upper ends 35 of the side members 28 are fixed to the upper ends of piston rods 36 connected with the pistons 27.

The pistons 27 are hydraulically actuated by liquid, preferably oil, supplied from a variable displacement, reversible flow pump 37 of a well known type. The pump shown is fully described in Patent No. 1,798,198 issued March 31, 1931, to Walter Ferris and John P. Ferris. It will suffice here to state that this pump is driven at constant speed through appropriate means, such as a pulley 38, and delivers liquid through pipes 39 or 40 and at a rate, from zero to a maximum, dependent upon the extent of movement of a control lever 41 from the upright or neutral position shown in full lines in Fig. 5. When the lever 41 is swung into the right dotted line position of Fig. 5 the pump delivers liquid at a maximum rate through pipe 39, liquid returning thereto through pipe 40; and when swung into the left dotted position the pump delivers at a maximum rate through pipe 40, liquid returning thereto through pipe 39. Pipe 39 is connected to the lower ends of cylinders 14 through branch pipes 42, and pipe 40 is connected to the upper ends of cylinders 14 through branch pipes 43. In this instance the lever 41 is actuated and controlled through a link 44 which is connected through a pin 45 with one arm 46 of a bell-crank, rockably supported upon a stub shaft 47 projecting horizontally from the right side of the frame 10. The other arm 48 of the bell-crank is in the form of a hand lever providing for convenient manual regulation of the pump.

A roller 49 on the pin 45 cooperates with one of the cam faces 50 and 51 of a dog 52 to effect automatic shifting of the lever 41 in a manner to be later explained. In this instance the dog 52 projects rearwardly from and moves with one of the upright members 28 of the work support. The lever 41 is also automatically shifted in a manner to be later described by a lever 53 rockably supported on the stub shaft 47 and normally connected with the hand lever 48 through a pawl 54 on the hand lever and releasably engaged in a notched quadrant 55 on the lever 53. The lower end of lever 53 is operatively connected to an actuating piston 56 working in a cylinder 57 fixed to the side of the frame 10. The pawl 54 is withdrawable from the quadrant 55 by a grip lever 58 and when so released the piston 56 and lever 53 will not interfere with the free manipulation of the hand lever 48.

In the machine shown provision is made for positioning the work piece A on the plate 29 and for ejecting the same therefrom. The mechanism for this purpose includes a star wheel 58′ fixed to a vertical shaft 59 journalled in a bearing bracket 60 projecting forwardly from the plate 29. The shaft 59 is telescopically engaged and splined in a hollow shaft 61 journalled in and depending from a bearing bracket 62 fixed to the top of the frame 10. Shafts 61 and 59 are intermittently rotated through appropriate ratchet mechanism including a three toothed ratchet wheel 63 fixed to the upper end of shaft 61 and cooperating with a pawl 64 pivotally mounted upon an arm 65 which projects radially from a segmental gear 66 loose on the shaft 61. The segmental gear 66 meshes with a rack bar 67 connected with and actuated by a piston 68 working in a cylinder 69 fixed to the top of the frame 10. The star wheel 58' is provided with three curved work supporting fingers 70 which sweep over the plate 29 and are shaped to receive individual pieces of work. The arrangement is such that star wheel 58' travels vertically with the plate 29 and, during each advance stroke of the piston 68, the shafts 61 and 59 and star wheel 58' are rotated through an angle of one hundred and twenty degrees. The piston 68 is hydraulically actuated in a manner to be later described.

In the machine shown provision is also made for automatically advancing the nose 20 of the tool through the work and into the draw head 17 before each working stroke and for withdrawing the nose of the tool from the draw head after each working stroke to permit insertion of a new piece of work onto the plate 29 before the next working stroke. This is accomplished by the use of mechanism which engages the rear end of the tool during the tool advancing and withdrawing functions and which retracts from the tool after each working stroke to permit removal of the finished work therefrom. The mechanism shown for this purpose comprises a head 71 socketed to receive the upper end or tail of the broaching tool and containing a pair of spring loaded detents 72 for yieldably engaging a V-shaped groove 73 formed in the tool. The head 71 is provided with a guide shoe 74 slotted to slidably receive the inner edges of the vertical guide plates 34 hereinabove mentioned. The head 71 is supported and actuated through the rod 75 of a piston 76 working in a vertical cylinder 77 which is fixed within a forwardly projecting portion 78 of the frame 10.

The tool locking piston 25, the pump regulating piston 56, the work handling piston 68, and the tool handling piston 76 are all automatically operated in predetermined sequence by a hydraulic system preferably such as will now be described. The system shown includes a gear pump 79 of a well known type which receives liquid, ordinarily oil, from a reservoir 80 and discharges into a pipe 81 which is permanently connected to the forward ends of cylinders 69 and 77 through branch pipes 82 and 83, so that pistons 68 and 76 are yieldably retained in the retracted positions shown in Fig. 5. A spring loaded relief valve 84 connected with pipe 81 determines the pressure therein. The relief valve 84 discharges into a drain pipe 85 leading back to the reservoir 80.

A valve 86 fixed to the frame 10 controls communication between the pressure pipe 81 and the rear ends of cylinders 69 and 77. This valve may assume various forms but as shown it comprises a plunger having three longitudinally spaced heads 87, 88 and 89 closely fitted for lengthwise movement within a bore 90. The opposite ends of the bore 90 are open to an exhaust pipe 90'. A pipe 91 leading from pipe 81 communicates at all times with the space between the heads 87 and 88. A pipe 92 controlled by the head 87 communicates with the rear end of cylinder 69. A pipe 93 leading from the cylinder 69 and controlled by piston 68 communicates with the rear end of cylinder 77. A check valve 94 connected across the pipes 92 and 93 permits a free flow from pipe 93 to pipe 92 but prevents flow in the opposite direction. A compression spring 95 acting on the head 89 urges the valve plunger toward the left. The valve plunger is controlled by a stem 96 connected at one end to the head 87 and at the other end to a link 97, which in turn is connected to one arm 98 of a control lever rockably supported intermediate its ends upon a stub shaft 99 fixed to the side of the frame 10. The control lever is provided with an operating handle 100, and the other arm 101 thereof is provided with a nose 102 for engagement with a detent pin 103, longitudinally reciprocable in bracket lugs 104 formed on the side of the frame 10. The detent 103 is operated and controlled by a hand lever 105, rockably supported upon a stub shaft 105' fixed to the side of the frame 10, and having a pin and slot connection 106 with the detent. A spring 107 between the lower bracket 104 and the hand lever 105 urges the lever and detent upwardly.

Figure 5:
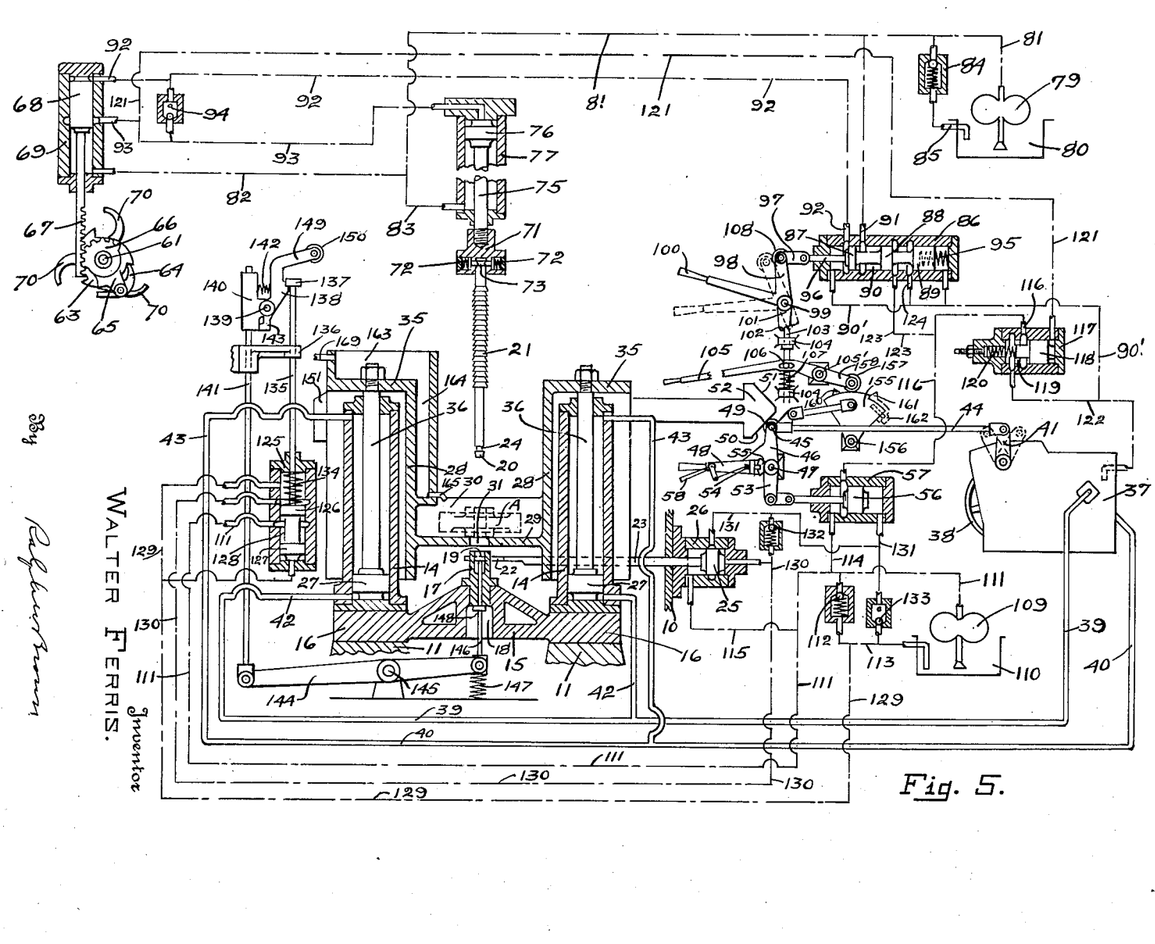
Fig. 5 is a schematic drawing of the hydraulic circuit and shows the pistons and plungers of the several valves and motors in the positions occupied when the machine is at rest.

The arrangement is such that with the plunger of valve 86 in the right position of Fig. 5, in which it is releasably retained by the engagement of detent 103 with the nose 102 of lever 101, pipe 91 is blocked from pipe 92, and pipe 92 is open to the exhaust pipe 90', so that there is no pressure in the rear ends of cylinders 69 and 77, and the pistons 68 and 76 are retained in the retracted positions shown by the pressure transmitted to the forward ends thereof through the branch pipes 82 and 83 and pipe 81. But upon depressing the hand lever 105 the detent 103 is withdrawn from the nose 102, and the plunger of valve 86 is advanced into the left position of Fig. 6 by the spring 95. Pipe 92 is then blocked from pipe 90' and connected with the pressure pipe 91, so that fluid pressure is then transmitted to the rear end of cylinder 69. Since the effective area of the rear face of piston 68 is greater than the front face thereof, by reason of the connection of rod 67 therewith, the piston 68 advances under the greater total pressure applied to the rear face thereof to thereby rotate the star wheel 58' counter-clockwise (Fig. 5) through an angle of one hundred and twenty degrees. Then as the piston 68 reaches the forward limit of its stroke it uncovers the end of pipe 93 and pressure is transmitted from pipe 92 into the rear end of cylinder 77. The effective area of the rear face of piston 76 is also greater than that of the front face thereof so that piston 76 then advances. It will be noted that, due to the control of pipe 93 by piston 68, piston 76 cannot advance until piston 68 has reached the forward end of its stroke.

Both pistons 68 and 76 remain in their advanced positions until the plunger of valve 86 is returned into the position shown in Fig. 5, either manually or by the action of the cam face 51 upon a roller 108 on the arm 98 of the control lever in a manner to be later described. When so shifted the detent 103 automatically engages the nose 102 of the control lever to again retain the valve plunger in the position of Fig. 5. The return of the valve plunger into this position reopens the rear end of cylinder 69 to the exhaust pipe 90' through pipe 92 and also reopens the rear end of cylinder 77 to the exhaust pipe through pipe 93, check valve 94 and pipe 92, and both pistons 68 and 76 return to their retracted positions by the pressure maintained in the forward ends of the cylinders through pipe 81 and branch pipes 82 and 83.

The tool locking piston 25 and the pump regulating piston 56 are energized by a second gear pump 109 of a well known type, which receives its supply from a reservoir 110 and discharges into a pipe 111. A pressure relief valve 112 connected with pipe 111 limits the pressure therein. Valve 112 discharges through a drain pipe 113 to the reservoir 110. Pipe 111 is permanently connected to the forward end of cylinder 57 through a pipe 114 and to the forward end of cylinder 26 through a pipe 115. A pipe 116 controlled by piston 56 leads from cylinder 57 to a cut-off valve 117 preferably such as will now be described. This valve comprises a piston 118 reciprocable within a bore 119 and yieldably retained in the position shown in Fig. 5 by a compression spring 120. The right end of bore 119 communicates with a pipe 121 connected with pipe 93 and the left end of the bore communicates with a drain pipe 122 leading to a reservoir in the bottom of the pump housing 37. Piston 118 controls pipe 116 so that when in the right position of Fig. 5 pipe 116 is open to the drain pipe 122, and when shifted into the left position of Fig. 7 pipe 116 is blocked by the piston. The arrangement is such that the piston 118 remains in the position shown in Fig. 5 so long as there is no pressure in pipe 93, in which position there can be no pressure in pipe 116, but the instant that pipe 93 is exposed to pressure by the advance of piston 68, this pressure transmitted through pipe 121 forces the piston 118 into the position of Fig. 7 to thereby block communication between pipe 116 and the drain pipe 122.

Pipe 116 is also connected through a pipe 123 with the space between the heads 88 and 89 of the valve 86, and a pipe 124 controlled by the head 89 connects with the drain pipe 90'. The arrangement is such that so long as the plunger of valve 86 remains in the position of Fig. 5 no pressure can exist in pipe 116 since it is then connected to the drain pipe 90' through pipes 123 and 124, but when the plunger of this valve is advanced into the position of Fig. 6 pipe 124 is blocked by head 89 and pipe 123 is no longer connected to drain.

It will thus be noted that when piston 56 is in the intermediate position of Fig. 5 pipe 115 is connected with pipe 116, and when the plungers of both valves 86 and 117 are in the right positions of this figure the pipe 111 from the gear pump 109 is connected with the drain pipe 122 so that the pressure in pipe 111 is destroyed and the pump 109 is ineffective. This condition remains until piston 56 is advanced so as to block pipe 116, or until the plungers of both valves 86 and 117 have been advanced into the positions shown in Figs. 7 and 8.

Pipe 111 from gear pump 109 leads to a control valve 125 which is ordinarily mounted upon the left side of the frame 10. This valve comprises a plunger having two heads 126 and 127 reciprocable in a bore 128 in the valve housing. Pipe 111 communicates with the space between the heads. The opposite ends of the bore 128 are connected through a pipe 129 with the drain pipe 113. A pipe 130 controlled by the head 126 leads to the rear end of cylinder 26, and a pipe 131 controlled by the piston 25 leads to the rear end of cylinder 57. A check valve 132 connected between pipes 130 and 131 permits a free flow from pipe 131 to pipe 130 but prevents flow in the opposite direction. A check valve 133 between the pipe 131 and the drain pipe 113 prevents flow from pipe 131 to pipe 113 but permits flow in the opposite direction.

A spring 134 urges the plunger of valve 125 downwardly toward the position of Fig. 5 in which position pipe 111 is blocked and pipe 130 is connected to drain pipe 129 so that there is no pressure in the rear end of cylinder 26 and the piston 25 is retained in the retracted position shown. Under certain conditions the plunger of this valve is elevated into the position of Fig. 8 by a stem 135 connected to the head 126, in which position pipe 111 is connected to the pipe 130. The stem 135 is guided in a bracket 136, fixed to the frame 10, and carries a head 137 at the upper end thereof which coacts with a pawl 138 rockably supported, as at 139, on a block 140 carried by a vertical rod 141. A spring 142 between the block and pawl urges the pawl forwardly into interlocking engagement beneath the head 137, and a stop element 143 on the pawl coacts with the block 140 to limit the forward swing of the pawl. The rod 141 is guided in the bracket 136 and is supported upon one end of a lever 144 rockably supported intermediate its ends upon a fixed fulcrum 145 within the base 13 of the machine. The other end of the lever 144 carries a vertical pin 146 which projects upwardly through the draw head 17 into the socket 19. A compression spring 147 beneath the lever 144 urges the pin 146 upwardly toward the position shown in Fig. 5 with a stop collar 148 thereon against the lower end of the draw head 17. The pawl 138 carries a trip arm 149 provided with a roller 150 disposed within the vertical path of travel of a cam 151 carried by one of the upright members 28 of the work support.

Figures 1, 6, 7, 8:
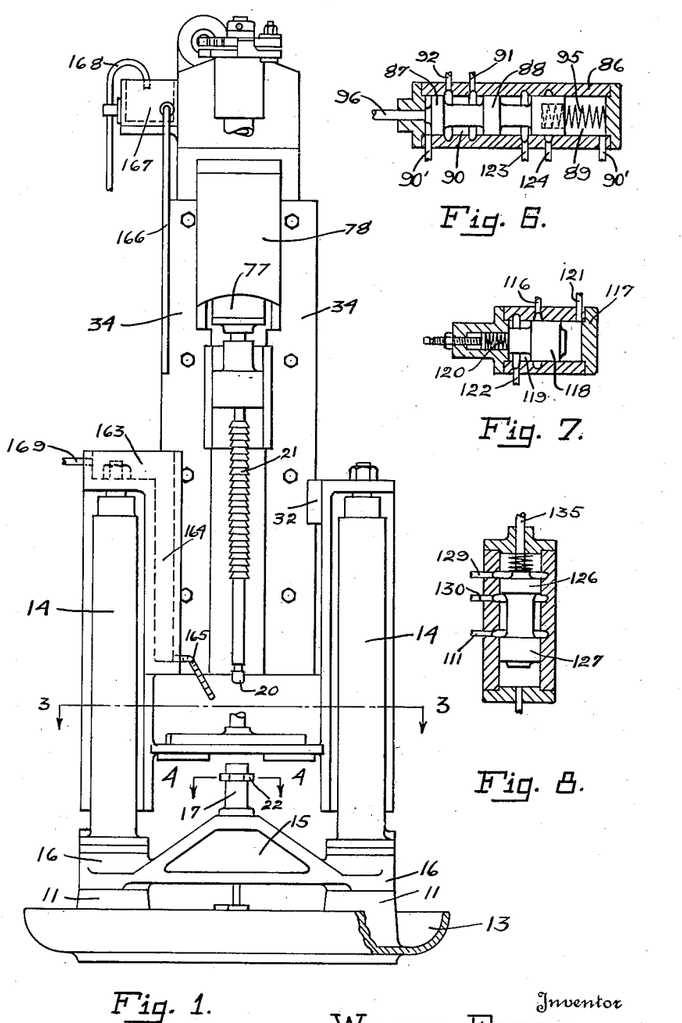
Fig. 1 is a front view with a part of the feed shaft omitted in order to expose the broaching tool.
Figs. 6, 7 and 8 are longitudinal sections showing the plungers of certain valves in the positions occupied during a cycle of operation of the machine.
Figure 2:
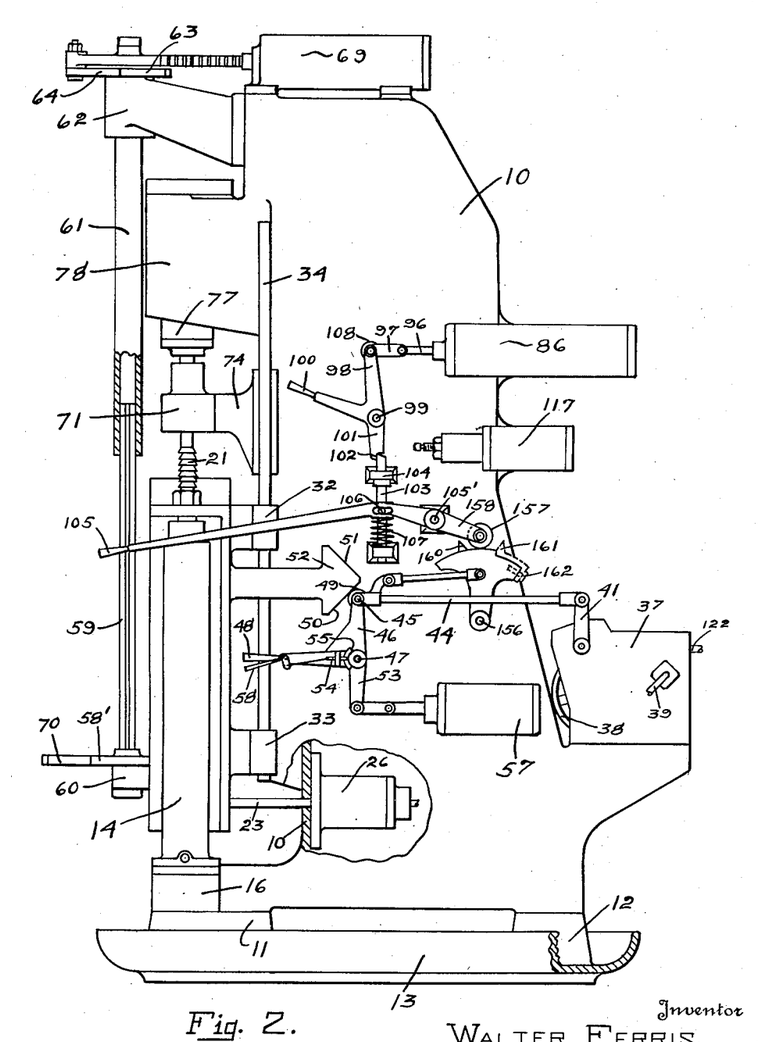
Fig. 2 is a side elevation of the machine, certain parts being shown in section.

The arrangement is such that when the nose 20 of the broach 21 is inserted into the socket 19 the pin 146 is depressed to thereby elevate the rod 141, block 140 and pawl 138 and thus lift the stem 135 and the valve plunger into the position of Fig. 8. This valve then remains in this position until the pawl 138 is tripped by the action of cam 151 upon the roller 150, during the upward travel of the work support, whereupon the pawl is withdrawn from the head 137 and the plunger of valve 125 returns to the lower position of Fig. 5. Thereafter upon removal of the broach from the socket 19 the pin 146 is elevated by the spring 147 and the rod 141 returns to the lower position of Fig. 5, in which position the pawl 138 is again reengaged beneath the head 137 on the valve stem 135.

The mechanism set forth above, which causes the machine to operate automatically throughout a cycle of operation, was invented jointly with John P. Ferris and is described and claimed in our copending application Serial No. 593,928 filed November 9, 1931.

Figure 3:
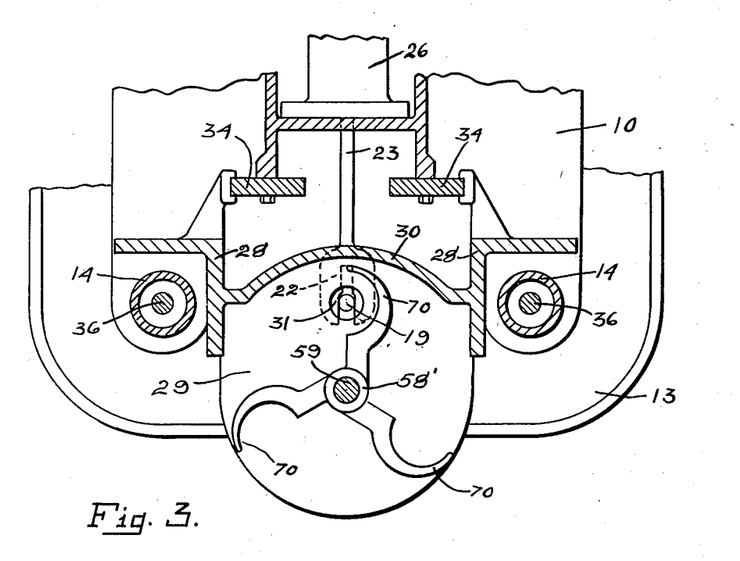
Fig. 3 is a sectional plan view taken on the line 3—3 of Fig. 1.

Fig. 5 illustrates the positions of all the parts before beginning an operating cycle. Preliminary to starting the cycle a piece of work to be broached is placed within the curvature of that finger 70 of the star wheel 58' whose open side is toward the opening 31 in the plate 29 (Fig. 3). The hand lever 105 is then depressed to thereby release the lever 98 and permit the plunger of valve 86 to assume the left position of Fig. 6, so as to connect pipe 92 to the pressure pipe 91 and cause the piston 68 to advance as previously exp'ained. This causes the star wheel 58' to rotate counter-clockwise through an angle of one hundred twenty degrees to thereby center the work piece beneath the nose 20 of the broach 21. This advance of piston 68 opens communication between pipes 92 and 93 so that pressure is then transmitted to the rear of cylinder 77 so as to project the nose of the broach through the work piece and into the socket 19, pressure also being transmitted through pipe 121 to shift the piston 118 of valve 117 into the left position of Fig. 7. Since the plungers of both valves 86 and 117 have been advanced into their left extreme positions, pipe 116 is no longer open to drain and the entire discharge from pump 109 flows through pipe 111 to the valve 125.

Then as the nose 20 of the broach advances into the socket, pin 146 is depressed thereby and the plunger of valve 125 is elevated into the position of Fig. 8. This opens communication between pipes 111 and 130 so that pressure is transmitted through pipe 130 to the rear end of the cylinder 26 and the forked end 22 of the locking bar 23 is advanced into engagement with the groove 24 in the broach to thereby lock the same in the draw head 17. As the piston 25 thus advances it opens communication between pipes 130 and 131 so that pressure is then transmitted to the rear end of cylinder 57 to thereby advance the piston 56 toward the left. This action, transmitted through the levers 53 and 46 and link 44, shifts the pump control lever 41 into the right dotted position of Fig. 5 to thereby cause the pump 37 to deliver liquid through pipe 39 and branch pipes 42 into the lower ends of the cylinders 14. The pistons 27 then move the work support upwardly so as to force the work piece lengthwise of the broach and thus effect a cutting or working stroke.

It will be noted that since the piston 25 controls the pipe 131, the pump control lever 41 cannot be shifted into starting position to thereby elevate the work support until the broach has been locked in the draw head 17 by the advance of the piston 25 and locking bar 23. Furthermore the piston 25 is not actuated until the plunger of valve 125 has been elevated sufficiently to connect pipe 130 with pipe 111, so that the broach locking mechanism cannot operate until the nose of the broach has been properly seated in the socket 19.

During the upward travel of the work table 29 under the action of pistons 27 the cam face 51 of the dog 52 strikes the roller 108 and returns the lever 98 into the full line position of Fig. 5 to thereby return the plunger of valve 86 into the right position of Fig. 5. This opens the pipe 92 to the drain pipe 90' so that the pistons 68 and 76 are again retracted by the pressure in the forward ends of cylinders 69 and 77, and so that the piston 118 of valve 117 is returned to the right position of Fig. 5 by the spring 120. This return stroke of the piston 68 is an idle stroke which merely retracts the pawl 64 into position behind the next tooth on the ratchet wheel 63. This upward or return stroke of piston 76 serves to lift the head 71 away from the upper end or tail of the broach 21, to thereby permit the work piece to pass upwardly clear of the broach. Then during continued upward movement of the work support the cam 151 strikes the roller 150 to thereby trip the pawl 138 out of engagement with the head 137 on the valve stem 135 and the plunger of valve 125 returns to the lower position of Fig. 5. This opens pipes 131 and 130 to the drain pipe 129, so that pistons 25 and 56 are retracted by the pressure in the forward ends of cylinders 26 and 57. Piston 25 withdraws the locking bar 23 to thereby release the nose of the broach, and the piston 56 returns the pump control lever 41 to the neutral full-line position of Fig. 5 to thereby stop the flow in pipe 39 and thus bring the work support to rest in its upper position. It will be noted that when the piston 56 reaches the intermediate position of Fig. 5 pipe 114 is open to pipe 116, which is at that time open to drain pipe 122, so that the pressure in the forward end of cylinder 57 is destroyed and the piston 56 then remains in this position.

Then when the hand lever 105 is again depressed the plunger of valve 86 again advances into the left position of Fig. 6 to thereby reconnect pipes 91 and 92 and thus effect another advance of piston 68. The star wheel 58' is thus rotated counter-clockwise through the next one hundred twenty degrees to thereby remove the work piece from the table, and as the piston 68 again connects pipe 92 with pipe 93 piston 76 is again advanced to thereby return the head 71 onto the tail of the broach with the detents 72 reengaged with the groove 73 in the broach. The piston 118 is also returned to the left position of Fig. 7 by the pressure thus established in pipes 93 and 121, to thereby disconnect pipe 116 from the drain pipe 122. When this occurs pressure is reestablished in the forward end of cylinder 57 and the piston 56 is forced into a right extreme position to thereby shift the pump control lever 41 into the left dotted position of Fig. 5. This action of lever 41 causes the pump 37 to deliver liquid through pipes 40 and 43 into the upper ends of cylinders 14 to thereby effect downward movement of the pistons 27 and the work support.

During this downward or return stroke of the work support the cam face 50 of the dog 52 (which had passed beyond the roller 108 during the upward or working stroke) strikes the roller 108 and returns the lever 98 and plunger of valve 86 into the right position of Fig. 5, so as to again effect the return of pistons 68 and 76 into the retracted positions shown and to return piston 118 to the right position of Fig. 5. As piston 76 thus moves upwardly it lifts the broach 21 clear of the draw head 17. The work support then continues downward until the pistons 27 reach the lower ends of cylinders 14, which occurs after the cam face 50 on dog 52 has reengaged the roller 49 and returned the pump control lever 41 into the full-line neutral position shown. The parts are then in position to receive a fresh piece of work in the star wheel 58' and to renew the cycle.

In the operation hereinabove described the work support comes to rest at both the upper and lower ends of its stroke and restarting in each instance requires manual depression of the hand lever 105. The machine shown is equipped with mechanism for automatically depressing this hand lever at either or both ends of the stroke to thereby render the operating cycle either automatic or semi-automatic. The mechanism shown for this purpose comprises a quadrant 155 rockably supported upon a stub shaft 156 projecting from the frame. This quadrant cooperates with a roller 157 on a rear extension 158 of the hand lever 105 and is connected through a link with the link 44 so as to rock simultaneously with the lever arms 46 and 41. A cam lug 160 formed on the quadrant is so positioned as to pass to the right of the roller 157 when the pump control lever 41 is shifted into the right dotted line position to start the work support upwardly. Then when the lever 41 is returned to the full-line neutral position to stop the work support at the upper end of the stroke the cam 160 again passes beneath the roller 157 to thereby elevate the same and thus automatically depress the hand lever 105. A similar cam 161 detachably fixed to the quadrant 155 by a screw 162 functions in a similar manner to automatically depress the hand lever 105 when the lever 41 is returned to the neutral position from the left dotted-line position of Fig. 5 as the work support reaches the lower end of its return stroke. When the cam 161 is removed from the quadrant the machine executes a complete working cycle including an upward working stroke of the work support and a downward return stroke thereof and then comes to rest at the end of the return stroke with the parts in position to renew this cycle whenever the hand lever 105 is again manually depressed; and when the cam 161 is applied to the quadrant the machine automatically repeats the cycle without attention by the operator.

The movement of the table 29 may be stopped, restarted, or reversed at any point in the cycle by manipulation of the handle 48 which is permanently connected to the pump control lever 41. In thus assuming manual control of the pump the handle 48 is ordinarily released from the lever 53 by disengaging the pawl 54, so that the piston 56 remains undisturbed and does not interfere with the free movement of handle.

In the machine shown provision is also made for supplying cutting lubricant to the work during the cutting stroke. In this instance mechanism for this purpose includes a feed reservoir 163 formed on one of the uprights 28 of the work support and having a well portion 164 extending downwardly to a point adjacent the piece of work. A discharge pipe 165 directs oil from the well to the work piece. Oil is supplied to the reservoir 163 through a pipe 166 which extends downwardly from an auxiliary reservoir 167 fixed to the top of the frame 10 over the reservoir 163. Reservoir 167 is supplied through a pipe 168 through which oil is pumped from the base 13. The pipe 166 terminates at a point adjacent the reservoir 163 when the work support is in its lower position and as the work support rises during a cutting stroke the pipe 166 enters the well 164. The well 164 performs a dual function, namely:— to maintain a head of oil of sufficient elevation to insure an ample flow through the discharge pipe 165, and to accommodate the pipe 166 during vertical travel of the work support. An overflow pipe 169 connected adjacent the top of the reservoir determines the oil level therein.

The invention herein set forth is susceptible of various modifications without departing from the scope thereof as hereafter claimed.

The invention is hereby claimed as follows:—

1. A broaching machine, comprising a stationary tool head, means for securing a broaching tool to said tool head upon one side thereof, a work support arranged upon the same side of said tool head for sustaining the pressure of the work, and power means arranged upon the same side of said tool head and alongside said broaching tool for moving said work support toward and from said tool head.

2. A broaching machine, comprising a stationary tool head, means for securing a broaching tool to said tool head upon one side thereof, a work support arranged upon the same side of said tool head for sustaining the pressure of the work, and reciprocating hydraulic motors arranged upon the same side of said tool head and alongside said broaching tool for moving said work support toward and from said tool head.

3. A broaching machine, comprising a stationary tool head, means for securing a broaching tool to said tool head upon one side thereof, a work support arranged upon the same side of said tool head for sustaining the pressure of the work, and two reciprocating hydraulic motors arranged upon the same side of said tool head upon opposite sides of said broaching tool for moving said work support toward and from said tool head.

4. A vertical broaching machine, comprising a stationary tool head, means for securing a broaching tool to said tool head upon the upper side thereof, power means arranged above said tool head and alongside said broaching tool, and a work support arranged above said tool head and connected to said power means to be reciprocated thereby toward and from said tool head.

5. A vertical broaching machine, comprising a stationary tool head, means for securing a broaching tool to said tool head upon the upper side thereof, reciprocating hydraulic motors arranged above said tool head and alongside said broaching tool, and a work support arranged above said tool head and connected to said motors to be reciprocated thereby toward and from said tool head.

6. A vertical broaching machine, comprising a stationary tool head, means for securing a broaching tool to said tool head upon the upper side thereof, two reciprocating hydraulic motors arranged above said tool head upon opposite sides of said broaching tool, and a work support arranged above said tool head and connected to said motors to be reciprocated thereby toward and from said tool head.

7. A vertical broaching machine, comprising a stationary tool head, means for securing a broaching tool to said tool head upon the upper side thereof, power means arranged above said tool head upon opposite sides of said broaching tool, and a U-shaped work support arranged above said tool head and connected to said power means to be reciprocated thereby toward and from said tool head.

8. A vertical broaching machine, comprising a stationary tool head, means for securing a broaching tool to said tool head upon the upper side thereof, two reciprocating hydraulic motors arranged above said tool head upon opposite sides of said broaching tool, and a U-shaped work support arranged above said tool head and connected to said motors to be reciprocated thereby toward and from said tool head.

9. A vertical broaching machine, comprising a base, a tool head carried by said base, a cylinder secured to said base alongside said tool head, a work support arranged above said tool head, and a piston arranged in said cylinder and connected to said work support for reciprocating it toward and from said tool head between the ends of said cylinder.

10. A vertical broaching machine, comprising a base, a tool head carried by said base, two cylinders secured to said base alongside said tool head and upon opposite sides thereof, pistons arranged in said cylinders, and a work support arranged between said cylinders and above said tool head and connected to the rods of said pistons to be reciprocated thereby between the ends of said cylinders.

11. A vertical broaching machine, comprising a base, a tool head carried by said base, two cylinders secured to said base alongside said tool head and upon opposite sides thereof, pistons arranged in said cyinders, and a U-shaped work support arranged between said cylinders and above said tool head and connected at the upper ends of its arms to the rods of said pistons to be reciprocated thereby between the ends of said cylinders.

12. A vertical broaching machine, comprising a stationary tool head, means for securing a broaching tool to said tool head upon the upper side thereof, reciprocating hydraulic motors arranged above said tool head and alongeside said broaching tool, a work support arranged above said tool head and connected to said motors to be reciprocated thereby toward and from said tool head, automatic means for moving a broaching tool into and out of engagement with said tool head, and feeding mechanism operated in sequence with said automatic means for feeding work into and out of position to be broached.

13. A vertical broaching machine, comprising a stationary tool head, means for securing a broaching tool to said tool head upon the upper side thereof, power means arranged above said tool head upon opposite sides of said broaching tool, a U-shaped work support arranged above said tool head and connected to said power means to be reciprocated thereby toward and from said tool head, automatic means for moving a broaching tool into and out of engagement with said tool head, and feeding mechanism operated in sequence with said automatic means for feeding work into and out of position to be broached.

14. A vertical broaching machine, comprising a base, a tool head carried by said base, a cylinder secured to said base alongside said tool head, a work support arranged above said tool head, a piston arranged in said cylinder and connected to said work support for reciprocating it toward and from said tool head between the ends of said cylinder, automatic means for moving a broaching tool into and out of engagement with said tool head, and feeding mechanism operated in sequence with said automatic means for feeding work into and out of position to be broached.

15. A vertical broaching machine, comprising a base, a tool head carried by said base, two cylinders secured to said base alongside said tool head and upon opposite sides thereof, pistons arranged in said cylinders, a U-shaped work support arranged between said cylinders and above said tool head and connected at the upper ends of its arms to the rods of said pistons to be reciprocated thereby between the ends of said cylinders, automatic means for moving a broaching tool into and out of engagement with said tool head, and feeding mechanism operated in sequence with said automatic means for feeding work into and out of position to be broached.

16. In a broaching machine having a drawhead for receiving the nose of a broach, a work support, and means for effecting relative movement between said drawhead and said work support to effect a cutting stroke, the combination of feeding mechanism for moving pieces of work along said support into position to be broached and for ejecting the same therefrom, a hydraulic motor for operating said feeding mechanism, a valve controlling said motor, and means for operating said valve automatically.

17. In a broaching machine having a drawhead for receiving the nose of a broach, hydraulic means for handling said broach to and from said drawhead, a work support, and means for effecting relative movement between said drawhead and said work support to effect a cutting stroke, the combination of feeding mechanism for moving pieces of work along said support into position to be broached and for ejecting the same therefrom, a hydraulic motor for operating said feeding mechanism and for controlling delivery of liquid to said broach handling means, a valve controlling said motor, and means for operating said valve automatically.

18. In a broaching machine having a drawhead for receiving the nose of a broach, a work support, and means for effecting relative movement between said drawhead and said work support to effect a cutting stroke, the combination of a star wheel carried by said support for moving pieces of work into and out of position to be broached, a telescopic shaft having one end secured to said star wheel, a ratchet mechanism connected to the other end of said shaft for rotating it, a hydraulic motor for operating said ratchet mechanism, and an automatically operable valve for controlling said motor.

19. A vertical broaching machine, comprising a stationary tool head, means for securing a broaching tool to said tool head to extend from the upper side thereof, a work support arranged above said tool head for supporting the work to be broached, power means arranged alongside said broaching tool above said tool head and connected to said work support for reciprocating it toward and from said tool head, and means for moving said work out of alinement with said tool.

20. A vertical broaching machine, comprising a stationary tool head, means for securing a broaching tool to said tool head to extend from the upper side thereof, a work support arranged above said tool head for supporting the work to be broached, two reciprocating hydraulic motors arranged above said tool head upon opposite sides of said tool and connected to said work support for reciprocating it toward and from said tool head, and means for moving said work out of alinement with said tool.

21. A vertical broaching machine, comprising a base, a tool head carried by said base, two cylinders secured to said base upon opposite sides of said tool head, a U-shaped work support arranged between said cylinders above said tool head and having a pressure plate for supporting the work to be broached and arms extending upwardly alongside said cylinders, pistons arranged in said cylinders and having the rods thereof connected to said work support for reciprocating the same, and means for moving work on said work support out of position to be broached.

In witness whereof, I hereunto subscribe my name this 9th day of December, 1929.

WALTER FERRIS.